United States Patent [19]

Kawabata et al.

[11] Patent Number: 4,924,927
[45] Date of Patent: May 15, 1990

[54] LOW-SECTION PNEUMATIC RADIAL TIRE

[75] Inventors: Misao Kawabata, Saitama; Hisao Ushikubo; Teruyuki Tominaga, both of Tokyo, all of Japan

[73] Assignee: Bridgestone Corporation, Tokyo, Japan

[21] Appl. No.: 259,638

[22] Filed: Oct. 19, 1988

[30] Foreign Application Priority Data

Oct. 21, 1987 [JP] Japan .............................. 62-263943
Jun. 30, 1988 [JP] Japan .............................. 63-163793

[51] Int. Cl.$^5$ .............................................. B60C 9/20
[52] U.S. Cl. ..................... 152/531; 152/209 R; 152/538
[58] Field of Search ............. 152/531, 533, 535, 536, 152/538, 209 R, 209 D

[56] References Cited

U.S. PATENT DOCUMENTS 4,807,681  2/1989  Kadota .......................... 152/531

FOREIGN PATENT DOCUMENTS 0158436  10/1985  European Pat. Off. .
57-61601  12/1982  Japan .
62-203803   9/1987  Japan .............................. 152/531
62-251202  11/1987  Japan .............................. 152/531
2061202    5/1981  United Kingdom .
2139574    3/1983  United Kingdom .
2118111   10/1983  United Kingdom .

OTHER PUBLICATIONS

Patents Abstracts of Japan, vol. 3, No. 62 (M-60), May 29, 1979, 54-38003.

Primary Examiner—Raymond Hoch
Attorney, Agent, or Firm—Sughrue, Mion, Zinn, MacPeak & Seas

[57] ABSTRACT

To improve high-speed durability of a low-section pneumatic radial tire without producing tire separation at both belt ends and expansion at both tread sidewalls after the tire has been worn off to some extent, the tire belt structure disposed between the tire tread and the carcass is composed of two belt layers and a plurality of auxiliary layers. The auxiliary layers comprises a first auxiliary layer extending over the belt layers and at least second and third auxiliary layers arranged on both axially outside end of the tread in such a way that an axially outer end of each of the auxiliary layers extends to near the tread sidewall and an axially inner end of each of the auxiliary layers extends to or beyond under at least an axially outermost circumferential groove formed on the tread in step fashion extending from tread center to tread end or vice versa. Further, these auxiliary layers are formed by winding a ribbon including at least two heat-shrinkable fiber cords coated with a coating rubber in spiral fashion on the circumferential surface of the belt layers.

8 Claims, 3 Drawing Sheets

5cm OR MORE

LOW-SECTION PNEUMATIC RADIAL TIRE

BACKGROUND OF THE INVENTION

1. Field of the Invention

The present invention relates to an improvement in a low-section pneumatic radial tire. More specifically it relates to an improvement in high-speed durability of a low-section pneumatic radial tire.

2. Description of the Prior Art

In general, low-section (wide-tread) pneumatic radial tires with an aspect ratio (a ratio of section height to maximum width of a tire) of 0.3 to 0.6 are called ultra-high performance tires, and suitable for use in high-speed vehicle travel.

FIG. 1 is a cross-sectional view for assistance in explaining an example of prior-art low-section pneumatic radial tires. In the drawing, the tire is formed with a cylindrical tread T extending between two tire sidewalls S which extend radially inward. The tire is roughly composed of a radial carcass 1 for reinforcing the tire from one sidewall S, through the tread T, to the other sidewall S, and a belt structure B having a width substantially the same as that of the tread T and disposed between the tread T and the radial carcass 1.

On the tread T, there are formed at least six circumferentially extending grooves made up of a pair of first innermost circumferential grooves 4A formed near the tire equatorial plane 0, a pair of second intermediate circumferential grooves 4B formed between the first innermost grooves 4A and both tread ends 6, and a pair of third outermost circumferential grooves 4C formed near the tread ends 6. These six circumferential grooves 4A, 4B and 4C divide the tread T into at least 7 lands including a first central land portion 5A, a pair of second intermediate land portions 5B, a pair of third intermediate land portions 5C, and a pair of fourth outermost land portions 5D.

The belt structure B is composed of at least two layers 2 formed by arranging inextensible metallic cords at a small inclination angle with respect to the tire equatorial plane 0 so that the cords of two different layers are laid one upon another in an intersectional relationship to each other. Three auxiliary layers are formed by arranging heat-shrinkable fiber cords on the outer circumferential surface of the belt layers 2 substantially in parallel to the tire equatorial plane 0.

The above-mentioned auxiliary layers 3 of the belt structure B is composed of a first auxiliary layer 3A extending over the entire width of the tire read T, a pair of second auxiliary layers 3B arranged at both side ends of the tire tread T in such away that the inner end of the layer 3B extends beyond under the outermost groove 4C, and a pair of third auxiliary layers 3C arranged at both side ends of the tire read T in such a way that the inner end of the layer 3C extends to a position slightly outward away from under the outermost groove 4C.

These three auxiliary layers 3 serve to prevent the belt layers 2 from expanding radially outward due to centrifugal force generated when the tire is rotating at high rotating speed, in order to improve the tire performance (durability) at high speed.

In the prior-art low-section pneumatic radial tire as described above, however, the inventors have found that there still exists a serious problem in that the belt layers are easily separated at both the tread side ends and/or the sidewalls are easily expanded into damage, in particular after the tire has been used to some extent and therefore worn off somewhat. In other words, the high-speed tire durability of the prior-art low-section pneumatic radial tire is still not satisfactory.

In summary, it has been known in the prior-art radial tire that the presence of the auxiliary layers 3A, 3B and 3C serves to prevent the tire tread from being expanded due to centrifugal force generated when the tire is rotated at high speed. However, it has not yet been noticed that the prior-art, radial tire involves a problem that the tire is extremely damaged after having been used to some extent.

SUMMARY OF THE INVENTION

With these problems in mind, therefore, it is the primary object of the present invention to provide a low-section pneumatic radial tire which can solve the problems involved in the prior-art low-section pneumatic radial tire after the tire has been used to some extent; that is, improve high-speed durability without causing tire separation at both tread side ends and expansion at both tire sidewalls after the tire has been worn off to some extent.

To achieve the above-mentioned object, in a low-section pneumatic radial tire including (a) a cylindrical tread formed with two sidewalls and at least four circumferential grooves, for dividing the tread into at least five land portions; (b) a radial carcass formed by arranging organic fiber cords at substantially right angles with respect to the tire circumferential direction, for reinforcing the sidewalls through the cylindrical tread; (c) a belt structure disposed between the cylindrical tread and the radial carcass and composed of at least two belt layers formed by arranging inextensible metallic cords at a small inclination angle with respect to a tire equatorial plane so that the cords of different belt layers are laid one upon another in intersectional relationship to each other, the present invention is characterized in that the auxiliary layers comprises (1) a first auxiliary layer extending substantially all over the belt layers; (2) a pair of second auxiliary layers formed on said first auxiliary layer; and (3) a pair of third auxiliary layers formed on said second auxiliary layer; said second and third auxiliary layers being arranged only on both axially outer sides of said cylindrical tread, respectively in such a way that an axially outer end of each of said second and third auxiliary layers extends to near an axially outer end of the first auxiliary layer and one axially inner end of each of said second and third auxiliary layers extends to or beyond under at least an axially outermost circumferential groove formed on said cylindrical tread; said first, second and third auxiliary layers being formed by winding a ribbon including at least two heat-shrinkable fiber cords coated with a coating rubber in spiral fashion on the circumferential surface of said belt layers.

The inventors have studied the reason why the belt layers are separated or the sidewalls are broken and damaged in particular after the tire has been worn off to some extent, and obtained the following results.

In the prior-art low-section pneumatic radial tire formed with seven or more land portions on the tread T, since the tread is very wide as compared with that of the ordinary tire, when the radial tire is rotated at an ultrahigh speed, there exists a tendency that the tire is easily worn off at the central area of the tread T into a flat cylindrical outer surface such that the outer tire tread surface (in cross section) becomes parallel to the tire rotational axis.

That is, since the low-section radial tire is used at an ultrahigh speed under low load during travel and therefore a large centrifugal force is applied to the tire, the central area having a great tread mass is easily projected outward in comparison with both the tread side areas. Therefore, the central tread area of the tire is first worn off with specific wear characteristics, so that the central tread rubber mass is reduced. On the other hand, since the tread rubber mass increases on both tread side ends into an unbalanced condition, the tread rubbers on both the tread side ends are expanded radially outward due to great centrifugal forces applied at both tread side ends. Thus distortion is concentrated to both the tread side ends and therefore heat is generated mainly on both the tread side ends when the tire is rotating at high speed. In other words, since great shearing strains are produced at the carcass ends or at the tire sidewalls and further the elasticity of the carcass is small, a separation problem at the carcass side ends occurs and further the sidewalls are expanded until breakage occurs.

In summary, the tire is first mainly worn off at the central tread area, but not worn off so much at both the tread side end areas. Therefore, after the radial tire has been worn off to some extent, both the tread side ends of less abrasion tend to expand radially outward when the tire is rotated at an ultrahigh speed, so that the belt layers may be separated at both the belt side ends, or the sidewalls are broken and damaged.

On the basis of the above-mentioned causes of belt separation and sidewall expansion, the inventors have found that it is possible to effectively prevent the belt side ends from being separated and the tire sidewalls from being expanded by further increasing the circumferential rigidity of the belt structure in particular on both the tread outer areas.

That is to say, the first feature of the radial tire according to the present invention is to provide at least two auxiliary layers on both tread outer areas in such a way that an axially inner end of each of the two auxiliary layers extends to or beyond under an axially outermost circumferential groove formed on said cylindrical tread.

In a first embodiment of the present invention, the circumferential rigidity of the belt structure is increased by four auxiliary layers superimposed in a step fashion extending from tread center to tread end. In a second embodiment of the present invention, the circumferential rigidity of the belt structure is increased by three auxiliary layers superposed in step fashion extending from tread end to read center.

Further, the second feature of the radial tire according to the present invention is to form these auxiliary layers by winding a ribbon including at least two heat-shrinkable fiber cords coated with a coating rubber in a spiral fashion on the circumferential surface of the belt layers. Therefore, it is possible to securely form auxiliary layers resistant against centrifugal force generated when the tire is rotated at ultrahigh speed.

BRIEF DESCRIPTION OF THE DRAWINGS

The features and advantages of the low-section pneumatic radial tire according to the present invention will be more clearly appreciated from the following description of the preferred embodiments of the invention taken in conjunction with the accompanying drawings.

DETAILED DESCRIPTION OF THE PREFERRED EMBODIMENTS

An embodiment of the low-section pneumatic radial tire according to the present invention will be described in detail hereinbelow with reference to the attached drawings.

Figure 2A:
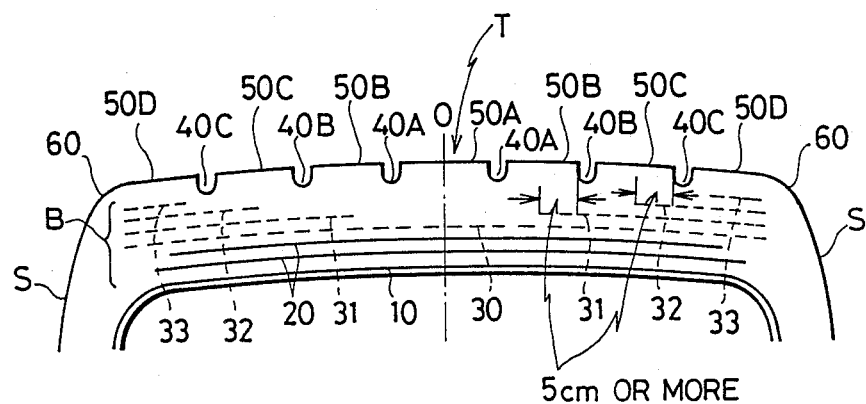
FIG. 2(A) is a partial cross-sectional view for assistance in explaining the first embodiment of the belt structure of the low-section pneumatic radial tire according to the present invention.

FIG. 2(A) shows a first embodiment of the present invention. In FIG. 2(A), although only the tread T of the tire is shown, the other portions except the tread are of well-known conventional structure. That is, the low-section pneumatic radial tire of the present invention includes a pair of annular bead cores (not shown), and a radial carcass 10 extending between the two bead cores in toroidal shape. This radial carcass is composed of a single or plural plies formed by arranging organic fiber cords (e.g. rayon, polyester, nylon, etc.) at substantially right angles with respect to the tire circumferential direction. Although not shown, both the side end portions of the carcass ply are wrapped around the head coves from the axially inner side to the axially outer side. Further, two spaces formed between these wrapped ply ends and the radial carcass are filled with a hard rubber filler, as is well known.

As shown in FIG. 2(A), the tire is formed with a cylindrical tread T extending between two tire sidewalls S which extend radially inward.

The tire is roughly composed of a radial carcass 10 for reinforcing the tire from one sidewall S, through the tread T, to the other sidewall S and a belt structure B having a width substantially the same as that of the tread and disposed between the tread T and the radial carcass 10.

On the tread T, there are formed six circumferentially extending grooves made up of a pair of first innermost circumferential grooves 40A located near the tire equatorial plane 0, a pair of second intermediate circumferential grooves 40B located between the first innermost grooves 40A and both tread side ends 60, and a pair of third outermost circumferential grooves 40C located near the tread side ends 60. These six circumferential grooves 40A, 40B and 40C, divide the tread T into at least 7 land portions including a first central land portion 50A, a pair of second intermediate land portions 50B, and a pair of third intermediate land portions 50C, and a pair of fourth outermost land portions 50D. These land portions are further divided into a number of blocks by a plurality of lateral grooves extending at inclination angles with respect to the circumferential grooves, as is well known.

A belt structure B is composed of at least two layers 20 formed by arranging inextensible metallic cords at a small inclination angle (about 30 to 50 degrees) with respect to the tire equatorial plane 0 so that the cords of different layers are laid one upon another in intersectional relationship to each other and a plurality of auxiliary layers 30, 31, 32 and 33 formed by arranging heat-shrinkable organic fiber cords on the outer circumferential surface of the belt layers 20 substantially in parallel to the tire equatorial plane 0.

The auxiliary layers are composed of a first auxiliary layer 30 extending over tread between the two tread side ends 60 with a width slightly wider than that of the belt layers 20; a pair of second auxiliary layers 31 extending between the second intermediate land portion 50B and the tread side end 60, respectively; a pair of third auxiliary layers 32 extending between the third intermediate land portion 50C and the tread side end 60, respectively; and a pair of fourth auxiliary layers 33 extending between the fourth outermost land portion 50D and the tread side end 60, respectively.

In other words, in the tire of the present invention, the first central land portion 50A is reinforced by the first auxiliary layer 30 extending over the tread T; the second intermediate land portions 50B are reinforced by the first and the second auxiliary layers 30 and 31; the third intermediate land portions 50C are reinforced by the first, second and third auxiliary layers 30, 31 and 32; and the fourth outermost land portions 50D are reinforced by the first, second, third and fourth auxiliary layers 30, 31, 32 and 33. Therefore, the rigidity of the belt structure B in the tire circumferential direction increases in a stepped fashion extending from the tread center to the tread side end, respectively.

The axially outer end of each of these auxiliary layers 30, 31, 32 and 33 is located at the axially outer side end of the fourth outermost land portions 50D, and the axially inner end of each of the auxiliary layers 31, 32 and 33 is preferably located at a position 5 cm or more inwardly away from the axially inner end of the circumferential grooves 40B and 40C, that is, at a position substantially near the middle of the land portions 50B and 50C. Without being limited to the above-mentioned conditions, it is also preferable that the inner end of each of the auxiliary layers is located within each block formed on the tire tread.

The feature of the first embodiment is to provide the plural auxiliary layers superimposed in step fashion extending from the tread center to the tread end, respectively.

By arranging the auxiliary layers as described above, it is possible to improve the hoop effect and the belt layer rigidity at both tread side end areas (in particular, the outermost land portions 50D), while decreasing the number of defective tires in the manufacturing process. Further, this arrangement of the auxiliary layers serves to prevent the auxiliary layers from being separated toward the axially inward direction of the tire.

Figure 2B:
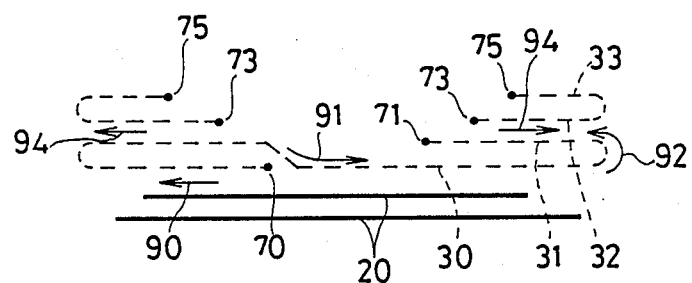
FIG. 2(B) is an illustration for assistance in explaining a first method of winding the auxiliary layers of the first embodiment according to the present invention shown in FIG. 2(A)

FIG. 2(B) is an illustration for assistance in explaining the first method of winding the auxiliary layers 30, 31, 32 and 33 according to the first embodiment. Each auxiliary layer can be formed by winding a ribbon 100 (shown in FIG. 2D) in spiral fashion in the tire circumferential direction (in parallel to the tire equatorial plane) on the belt layers 20. The ribbon 100 is formed by reinforcing a coating rubber 112 by 2 to 15 heat-shrinkable nylon cords 111 arranged in parallel to each other, as shown in FIG. 2(D).

In FIG. 2(B), in order to form the first and second auxiliary layers 30 and 31, the ribbon 100 is first wound beginning from a winding start point 70 in the axially leftward direction as shown by arrow 90 to the axially outer end of the tire. When the ribbon 100 reaches an axially outermost end of the auxiliary layers, the ribbon 100 is then wound in the opposite direction as shown by arrow 91 to another axially outermost end of the auxiliary layers. When the ribbon 100 reaches the axially outermost end of the suxiliary layers, the ribbon 100 is returned again in the leftward direction as shown by arrow 92 to a winding end point 71 mirror symmetrical with respect to the winding start point 70 about the tire equatorial plane. To form the third and fourth auxiliary layers 32 and 33, the ribbon 100 is first wound beginning from a winding start point 73 in the axially outward direction as shown by arrow 94 to the axially outer end of the auxiliary layers. When the end of the ribbon 100 reaches the end of the auxiliary layers, the ribbon 100 is then wound in the opposite direction to a winding end point 75 slightly outward away from the start point 73.

Further, it is preferable to cut off the end of ribbon at an inclination angle from 20 to 70 degrees with respect to the tire circumferential direction at the winding start points 70 and 73 and the winding end points 71 and 75, respectively.

Figure 2C:
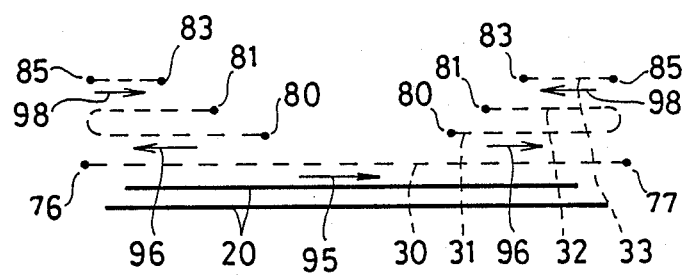
FIG. 2(C) is an illustration for assistance in explaining a second method of winding the auxiliary layers of the first embodiment according to the present invention shown in FIG. 2(A)
Figure 2D:
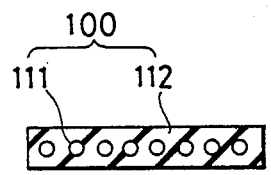
FIG. 2(D) is a cross-sectional view for assistance in explaining a ribbon wound to form the auxiliary layers.

FIG. 2(C) is an illustration for assistance in explaining the second method of winding the auxiliary layers 30, 31, 32 and 33 according to the present invention. In the same way, each auxiliary layer can be formed by winding the ribbon 100 in spiral fashion in the circumferential direction on the belt layer 20. To form the first auxiliary layer 30, the ribbon 100 is wound beginning from a winding start point 76 to a winding end point 77 in the direction as shown by arrow 95. The above winding direction can of course be reversed in the opposite direction from the point 77 to the point 76.

To form the second and third auxiliary layers 31 and 32, the ribbon 100 is first wound beginning from a winding start point 80 in the axially outward direction as shown by arrow 96 to the axially outer end of the tire. When the end of the ribbon 100 reaches the outermost end of the auxiliary layers, the ribbon 100 is then wound in the opposite direction to a winding end point 81 slightly outward away from the start point 80 in the direction as shown by arrow 98.

To form the fourth auxiliary layer 33, the ribbon 100 is wound beginning from a winding start point 83 to a winding end point 85. The above winding direction can of course be reversed from the point 85 to the point 83.

Figure 3A:
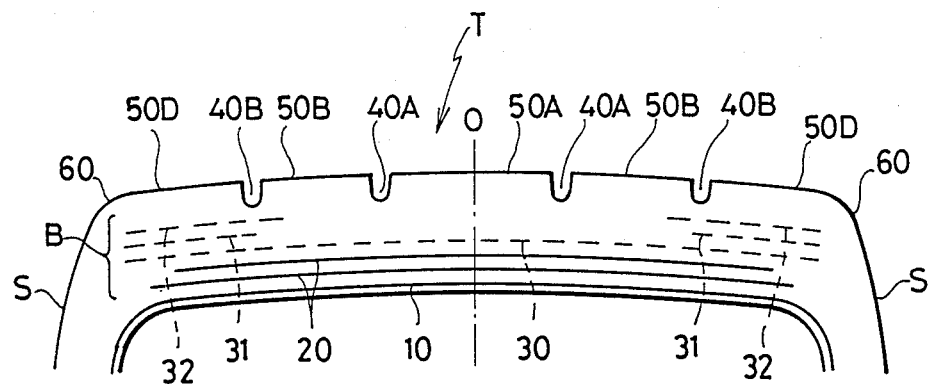
FIG. 3(A) is a partial cross-sectional view for assistance in explaining the second embodiment of the belt structure of the low-section pneumatic radial tire according to the present invention.

FIG. 3(A) shows a second embodiment of the present invention. In FIG. 3(A), the tire is formed with a cylindrical tread portion T extending between two tire sidewalls which extend radially inward. The tire is roughly composed of a radial carcass 10 and a belt structure B having a width substantially the same as that of the tread and disposed between the tread T and the radial carcass 10.

On the tread T, there are formed at least four circumferentially extending circumferential grooves arranged at roughly regular intervals on the tread between the two tread side ends 60. The circumferential grooves are made up of a pair of first inner circumferential grooves 40A located near the tire equatorial plane 0, and a pair of second outer circumferential grooves 40B located near the tread side ends 60. By these four circumferential grooves 40A and 40B, the tread T is divided into five land portions including a first central land portion 50A, a pair of second intermediate land portions 50B, and a pair of third outer land portions 50D. These land portions are further divided into a number of blocks by a plurality of lateral grooves extending at inclination angles with respect to the circumferential grooves, as is well known.

A belt structure B is composed of at least two layers 20 formed by arranging inextensible metallic cords at a small inclination angle with respect to the tire equatorial plane 0 and a plurality of auxiliary layers 30, 31 and 32 formed by arranging heat-shrinkable organic fiber cords on the outer circumferential surface of the belt layers 20 substantially in parallel to the tire equatorial plane 0.

The auxiliary layers are composed of a first auxiliary layer 30 extending over the tread between the two tread side ends 60 with a width a little wider than that of the belt layers 20, a pair of second auxiliary layers 31 extending from the tread side end to a position just under the bottom of the second outer circumferential groove 40B, respectively, and a pair of third auxiliary layers 32 extending from the tread side end to a position slightly axially inward away from under the groove 40B, respectively. That is, the feature of the present embodiment is to extend the third (radially outward) auxiliary layers 32 slightly away from the axially inner end of the second auxiliary layers 31. In this second embodiment, it is also possible to extend the axially inward ends of the second and third auxiliary layers 31 and 32 to or beyond under the first inner circumferential groove 40A, respectively.

The feature of the second embodiment is to provide the plural auxiliary layers superimposed in step fashion extending from the tread end to the tread center, respectively. Further, in this second embodiment, it is also possible to provide a fourth auxiliary layer (not shown) in the outmost land portion 50D, respectively.

Figure 3B:
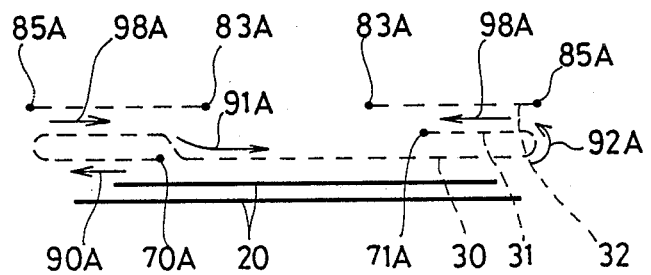
FIG. 3(B) is an illustration for assistance in explaining a first method of winding the auxiliary layers of the second embodiment of the present invention.

FIG. 3(B) is an illustration for assistance in explaining the first method of winding the auxiliary layers 30, 31 and 32 according to the second embodiment. To form the first and second auxiliary layers 30 and 31, the ribbon 100 is first wound beginning from a winding start point 70A in the axially outward direction as shown by arrow 90A to the axially outermost end of the auxiliary layers. When the end of the ribbon 100 reaches the tire outer end, the ribbon 100 is then wound in the opposite direction as shown by arrow 91A to another axially outermost end of the auxiliary layers. When the end of the ribbon 100 reaches the tire outer end, the ribbon 100 is returned in the original direction as shown by arrow 92A to a winding end point 71A mirror symmetrical to the start point 70A about the tire equatorial plane.

To form the third auxiliary layer 32, the ribbon 100 is wound beginning from a winding start point 83A to a winding end point 85A, respectively. The above winding direction can of course be reversed from the point 85A to the point 83A.

Test Results

The effects of the low-section pneumatic radial tire according to the present invention have been verified by the following experiments.

(1) Invention tires

Radial tires as shown in FIG. 2(A) were manufactured. The tire size was 255140 ZR 17. The radial carcass 10 was formed by arranging rayon cords 1650 d/2. The belt layers 20 were formed by arranging 0.23×1×5 steel cords at an inclination angle 25 degrees with respect to the tire circumferential direction in such a way that cords of different belt layers were laid one upon another so as to intersect each other.

The first auxiliary layer 30 was formed by arranging 1260 d/2 nylon cords into a single layer in parallel to the tire circumference so as to cover the entire width of the belt layers 20. The second auxiliary layers 31 were formed by arranging the same nylon cords between the tread side ends and the second intermediate land portion 50B so that the axially inner end thereof extends to the middle of the land portion 50B. The third auxiliary layers 32 were formed by arranging the same nylon cords between the tread side ends and the third intermediate land portion 50C so that the axially inner end thereof extends to the middle of the land portion 50C. Further, the fourth auxiliary layers 33 were formed by arranging the same nylon cords at the third outer land portions 50D. That is, four auxiliary layers were superposed at the outer land portions 50D. The structure except the above was substantially the same as in the ordinary radial tire.

(2) Prior art tires

Figure 1:
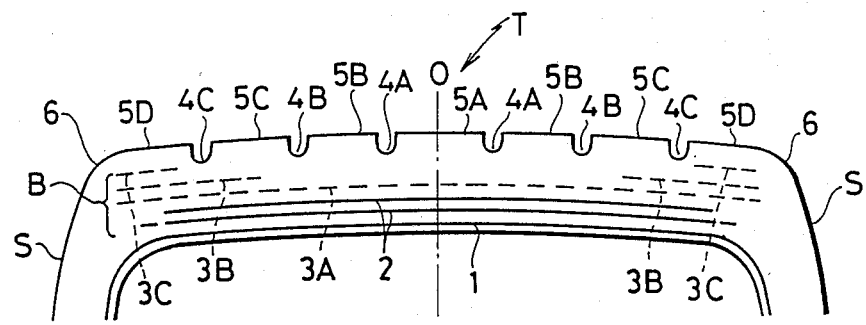
FIG. 1 is a partial cross-sectional view for assistance in explaining the belt structure of the prior-art low-section pneumatic radial tire.

For comparison, radial tires as shown in FIG. 1 were manufactured, in which two auxiliary layers are arranged being superposed at the outer land portion 5D. The structure except the above was substantially the same as in the ordinary radial tire.

(3) High-speed durability tests

Actual vehicle test conditions

* Tire inflation pressure: 2.5 kg/cm$^2$
* Tire load: 500 kg
* Vehicle speed: 100 km/hr. increased step by step (10 km/h by 10 km/h)
* Tire wear-off rate: 50%

The durability indices of the invention tires were 125, where that of the prior-art tires were set to 100.

As described above, in the radial tire of the present invention, since the circumferential rigidity of the belt structure is increased in stepped fashion from the tread center to tread ends or vice versa in such a way that the maximum rigidity can be obtained on both the tread side ends due to the hoop effect of these auxiliary layers, it is possible to effectively prevent the belt layers from being separated at the belt side end portions and the tire sidewalls from being expanded into breakage, in particular when the tire has been worn off to some extent, thus improving the high-speed durability.

What is claimed is:

1. In a low-section pneumatic radial tire including:
   (a) a cylindrical tread formed with two tread sidewalls and at least four circumferential grooves, for dividing the tread into at least five land portions;
   (b) a radial carcass formed by arranging organic fiber cords at substantially right angles with respect to the tire circumferential direction, for reinforcing the sidewalls through the cylindrical tread;
   (c) a belt structure disposed between the cylindrical tread and the radial carcass and composed of at least two belt layers formed by arranging inextensible metallic cords at a small inclination angle with respect to a tire equatorial plane so that the cords of different belt layers are laid one upon another in an intersectional relationship to each other;
   (d) auxiliary layers formed by arranging heat-shrinkable fiber cords on the outer circumferential surface of the belt layers substantially in parallel to the tire equatorial plane, the improvement wherein said auxiliary layers comprises:
(1) a first auxiliary layer extending substantially completely over the belt layers;
(2) a pair of axially spaced second auxiliary layers formed on said first auxiliary layer; and
(3) a pair of axially spaced third auxiliary layers formed on said second auxiliary layer; said second and third auxiliary layers being arranged only in both axially outer sides of said cylindrical tread, respectively in such a way that an axially outer end of each of said second and third auxiliary layers axially extends to or beyond under at least an axially outermost circumferential groove formed on said cylindrical tread; said first, second and third auxiliary layers being formed by winding a ribbon including at least two heat-shrinkable fiber cords coated with a coating rubber in spiral fashion on the circumferential surface of said belt layers, respectively.

2. The low-section pneumatic radial tire of claim 1, wherein the axially inner end of each of said second auxiliary layers axially extends beyond under another circumferential groove adjacent to the outermost circumferential groove, and the axially inner end of each of said third auxiliary layers axially extends beyond under the axially outermost circumferential groove so that said second and third auxiliary layers are superposed in step fashion extending from tread center to tread end.

3. The low-section pneumatic radial tire of claim 1, wherein an axially inner end of each of said second auxiliary layers axially extends to under an axially outermost circumferential groove, and an axially inner end of each of said third auxiliary layers axially extends inward beyond the axially outermost circumferential groove so that said second and third auxiliary layers are superposed in step fashion axially extending from tread end to tread center.

4. The low-section pneumatic radial tire of claim 2, which further comprises a pair of fourth auxiliary layers formed on said third auxiliary layer, said fourth auxiliary layers being arranged on both axially outermost ends of said cylindrical tread in such a way that an axially outer end of each of said fourth auxiliary layers axially extends to near the axially outer end of the first auxiliary layer and an axially inner ends of each of said fourth auxiliary layers axially extends to a position slightly axially outward away from the axially outermost circumferential groove.

5. The low-section pneumatic radial tire of claim 2, wherein the axially inner end of each of said second auxiliary layer axially extends inward beyond under another circumferential groove adjacent to the outermost circumferential groove to near a middle of one of the tread land portions, and the axially inner end of each of said third auxiliary layers axially extends inward beyond under an axially outermost circumferential groove to near a middle of one of the tread land portions.

6. The low-section pneumatic radial tire of claim 4, wherein said first and second auxiliary layers are formed by winding the ribbon on a circumferential surface of said belt layer in such a way that ribbon winding is started from a winding start point near under a circumferential groove adjacent to the outermost circumferential groove toward a first tread end; when reaching the first tread end, reversed toward a second opposite tread end; when reaching the second tread end, further reversed toward the first tread end to a winding end point near under another circumferential groove adjacent to the outermost circumferential groove; and said third and fourth auxiliary grooves are formed by winding the ribbon on a circumferential surface of said second auxiliary layer in such a way that ribbon winding is started from a winding start point near under the outermost circumferential groove toward a first tread end, and reversed to a second opposite end to near under the outermost circumferential groove.

7. The low-section pneumatic radial tire of claim 1, wherein said first auxiliary layer is formed by winding the ribbon on a circumferential surface of said belt layers from a first tread end position to a second tread end position; and said second and third auxiliary layers are formed by winding the ribbon on a circumferential surface on said first auxiliary layer in such a way that ribbon winding is started from a winding start point near a circumferential groove adjacent to the outermost circumferential groove toward a first tread end, and reversed toward a second opposite end to near under the outermost circumferential groove.

8. The low-section pneumatic radial tire of claim 1, wherein said first and second auxiliary layers are formed by winding the ribbon on a circumferential surface of said belt layers in such a way that ribbon winding is started from a winding start point near under a first outermost circumferential groove toward a first tread end; when reaching the first tread end, reversed toward a second opposite tread end; end when reaching the second tread end, further reversed toward the first tread end to a winding end point near under a second opposite outermost circumferential groove; and said third auxiliary layers are formed on said second auxiliary layer, respectively by winding the ribbon from a tread end start point to a winding end position inward away beyond under the axially outermost circumferential groove.

* * * * *